US012499013B2

(12) United States Patent
Bernard et al.

(10) Patent No.: US 12,499,013 B2
(45) Date of Patent: Dec. 16, 2025

(54) TRACKING WRITES AND SNAPSHOT CREATION/DELETION IN MEMORY TO IMPROVE ASYNCHRONOUS REPLICATION PERFORMANCE AND SUPPORT LOWER RECOVERY POINT OBJECTIVES (RPOs)

(71) Applicant: Dell Products L.P., Round Rock, TX (US)

(72) Inventors: David Bernard, Westford, MA (US); Mayank Ajmera, Cary, NC (US); Vamsi K. Vankamamidi, Hopkinton, MA (US); Vikram Prabhakar, Apex, NC (US)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 18/401,916

(22) Filed: Jan. 2, 2024

(65) Prior Publication Data
US 2025/0217234 A1 Jul. 3, 2025

(51) Int. Cl.
*G06F 11/14* (2006.01)
(52) U.S. Cl.
CPC ...... *G06F 11/1451* (2013.01); *G06F 11/1456* (2013.01); *G06F 11/1464* (2013.01)
(58) Field of Classification Search
CPC ............. G06F 11/1451; G06F 11/1456; G06F 11/1464
See application file for complete search history.

(56) References Cited

U.S. PATENT DOCUMENTS

| 9,720,619 | B1* | 8/2017 | Shah ..................... G06F 3/0619 |
| 10,761,941 | B1* | 9/2020 | Redko ................. G06F 11/1451 |
| 11,269,776 | B2 | 3/2022 | Chen et al. |
| 11,409,455 | B2 | 8/2022 | Chen et al. |
| 11,409,700 | B2* | 8/2022 | Ren ..................... G06F 11/3034 |
| 11,514,075 | B2 | 11/2022 | Haravu et al. |
| 11,809,274 | B2 | 11/2023 | Tal et al. |
| 12,117,989 | B1* | 10/2024 | Taylor ................. G06F 16/2379 |
| 12,210,763 | B1* | 1/2025 | Taylor ..................... G06F 3/067 |
| 2020/0133919 | A1* | 4/2020 | Ren ......................... G06F 3/0641 |
| 2020/0348980 | A1* | 11/2020 | Meiri ..................... G06F 9/5061 |
| 2021/0034484 | A1* | 2/2021 | Meiri ...................... G06F 13/28 |
| 2023/0342064 | A1* | 10/2023 | Haravu .................. G06F 3/065 |
| 2023/0409534 | A1* | 12/2023 | Kashi Visvanathan ..................... G06F 11/1451 |

(Continued)

*Primary Examiner* — Kamini B Patel
(74) *Attorney, Agent, or Firm* — BainwoodHuang

(57) ABSTRACT

Techniques for tracking incoming writes and snap creation/deletion in memory to improve asynchronous replication and support lower RPOs. In the techniques, a storage system uses its data cache to receive data specified in write requests issued by storage clients, while dedicating an amount of the cache memory to track and record offsets/lengths of writes directed to source volumes. At the end of each replication interval, the storage system obtains a list of the recorded offsets/lengths for each source volume, identifies and reads areas of the source volume that were written to during the replication interval using the list, and replicates data from the identified areas to a destination volume. Because the list of recorded offsets/lengths of incoming writes for the source volume is compiled and available from volatile cache memory, it can be generated and accessed very quickly using reduced processing/memory resources, allowing for lower RPOs in asynchronous replication processes.

15 Claims, 6 Drawing Sheets

(56) References Cited

U.S. PATENT DOCUMENTS

2024/0143554 A1* 5/2024 Kaushik ................ G06F 16/128
2025/0061092 A1* 2/2025 Khilko ................. G06F 16/184

* cited by examiner

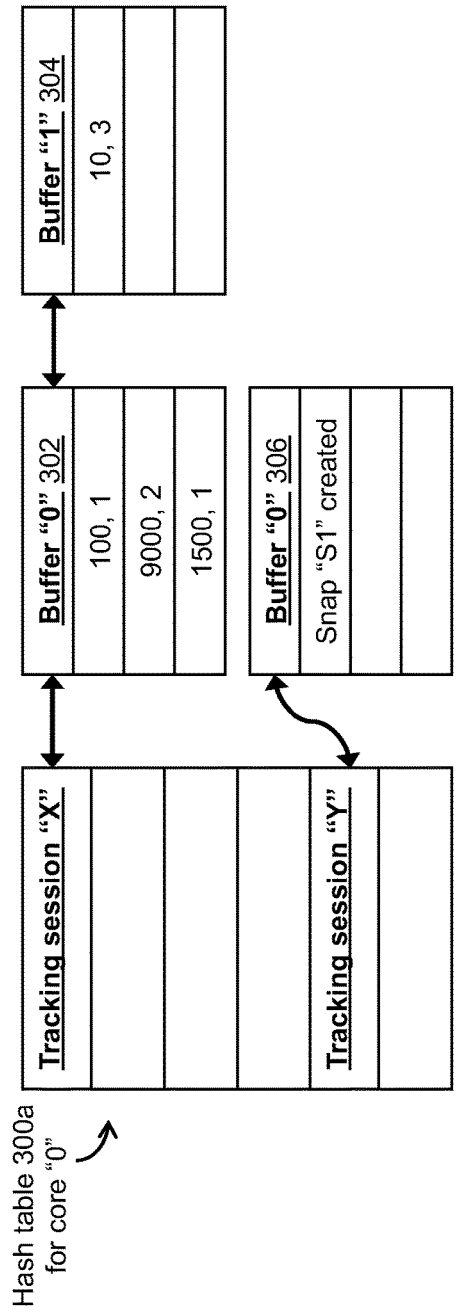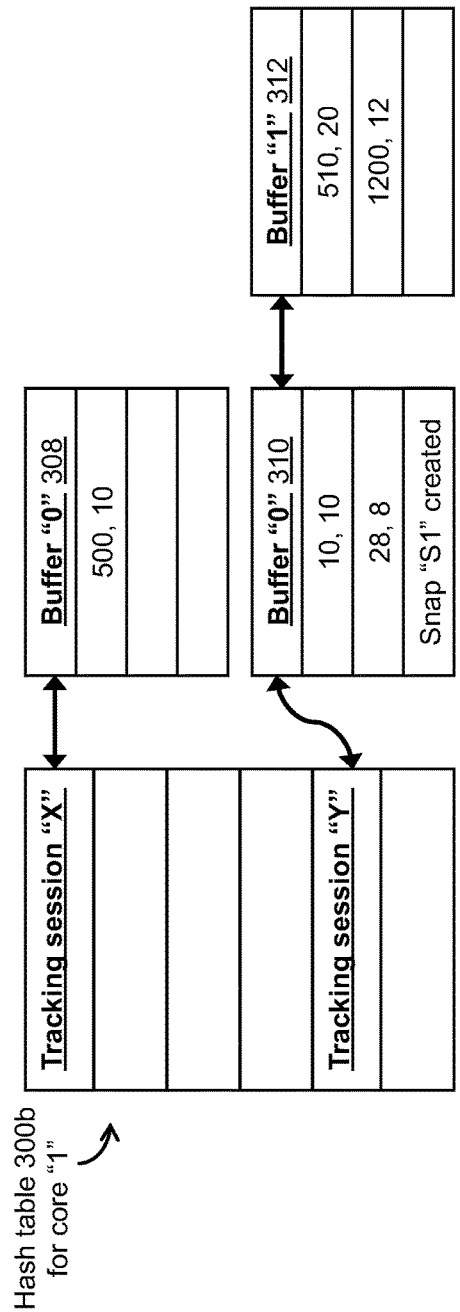
Fig. 3a
Fig. 3b

| Tracking session ID | Write (offset, length (x4Kb)) | Core (for Write) |
|---|---|---|
| X | 100, 1 | 0 |
| X | 2000, 4 | 2 |
| Y | 10, 10 | 1 |
| Y | 800, 1 | 2 |
| X | 9000, 2 | 0 |
| Y | 28, 8 | 1 |
| | User snap "S1" created | |
| Y | 80, 10 | 2 |
| X | 1500, 1 | 0 |
| X | 500, 10 | 1 |
| X | 10, 3 | 0 |
| Y | 510, 20 | 1 |
| Y | 1200, 12 | 1 |
| Y | 400, 30 | 2 |

TABLE

*Fig. 4*

TRACKING WRITES AND SNAPSHOT CREATION/DELETION IN MEMORY TO IMPROVE ASYNCHRONOUS REPLICATION PERFORMANCE AND SUPPORT LOWER RECOVERY POINT OBJECTIVES (RPOs)

BACKGROUND

Storage systems typically perform asynchronous replication processes, which include creating, at intervals, point-in-time (PIT) snapshots (or "snaps") of source storage objects (e.g., source volumes), comparing the most recently created snaps to determine any changes or differences in data (or "data differences"), and transmitting or transferring the data differences for storage to destination storage objects (e.g., destination volumes). The storage systems perform asynchronous replication in accordance with replication policies based on recovery point objectives (RPOs) for given replication workloads. An RPO is a user-defined metric typically specified by a service level agreement. Intervals between replication syncs (or "replication intervals") are determined based on RPOs and internal system conditions in a manner that enables compliance with the RPOs. In general, an RPO refers to an acceptable amount of data loss, measured in time, relative to when a failure event occurs at a storage system. More specifically, an RPO denotes a maximum acceptable delay between the time when data is committed to a source storage system, and the time when the data is committed to a destination storage system. RPOs are typically specified based on the criticality of application data, customer needs, and so on.

SUMMARY

In an asynchronous replication process, a storage system can initiate a replication sync by creating PIT snaps of a source volume at the beginning and at the end of a replication interval. Having created the PIT snaps of the source volume, the storage system can identify and read areas (e.g., blocks) of the source volume that were written to, overwritten, or modified, and need to be replicated to a destination volume. To that end, the storage system can issue a snap differential bitmap request (or "snap diff request") to a namespace layer to obtain data differences between the snaps of the source volume, and identify and read blocks of the source volume that correspond to the obtained data differences. Such an approach has drawbacks, however, because obtaining data differences between snaps by servicing snap diff requests can be prohibitively slow and resource intensive. For example, servicing snap diff requests may require flushing snap data and any dirty pages from cache memory to a mapper layer, potentially causing write splits in the mapper layer, as well as making multiple pass walks of data structures (e.g., B+ trees) in the mapper layer to identify and read logical areas not shared between the snaps. Because the servicing of snap diff requests can be slow and resource intensive, it can result in high RPOs (e.g., five (5) minutes or more) and adversely impact IO performance for other storage objects on the storage system.

Techniques are disclosed herein for tracking write requests and snap creation/deletion in memory to improve asynchronous replication performance and support lower RPOs. In the disclosed techniques, a storage system can use its data cache to receive data specified in incoming write requests issued by storage client computers (or "storage clients"), while dedicating an amount of data cache memory to track and record locations (e.g., offsets) and lengths of writes directed to a source volume. At the end of a replication interval, the storage system can obtain a list of the recorded offsets and lengths of writes for the source volume, identify and read areas of the source volume that were written to, overwritten, or modified during the replication interval using the obtained list, and replicate data from the identified areas to a destination volume. Because the list of recorded offsets/lengths of writes for the source volume is compiled and available from volatile cache memory, it can be generated and accessed very quickly using reduced processing and memory resources, thereby allowing for lower RPOs (e.g., less than five (5) minutes, less than one (1) minute) in asynchronous replication processes.

In certain embodiments, a method includes receiving, at a volatile memory of a storage system, first data specified in a plurality of first writes directed to a source volume in a first tracking session. The first tracking session corresponds to a first replication interval of an asynchronous replication process. The method includes, in response to receipt of the first data specified in the plurality of first writes, recording offsets and lengths of the respective first writes in the volatile memory, and, in response to an end of the first tracking session, obtaining a first list of the recorded offsets and lengths of the respective first writes from the volatile memory. The method includes identifying first areas of the source volume written to in the first tracking session using the obtained first list, and replicating the first data from the identified first areas of the source volume to a destination volume.

In certain arrangements, the method includes receiving, at the volatile memory of the storage system, second data specified in a plurality of second writes directed to the source volume in a second tracking session. The second tracking session corresponds to a second replication interval of the asynchronous replication process. The method includes, in response to receipt of the second data specified in the plurality of second writes, recording offsets and lengths of the respective second writes in the volatile memory.

In certain arrangements, the method includes, in response to an end of the second tracking session, obtaining a second list of the recorded offsets and lengths of the respective second writes from the volatile memory, identifying second areas of the source volume written to in the second tracking session using the obtained second list, and replicating the second data from the identified second areas of the source volume to the destination volume.

In certain arrangements, a first portion of the plurality of first writes are processed by a first central processing unit (CPU) core, and a second portion of the plurality of first writes are processed by a second CPU core. The method includes recording offsets and lengths of the first portion of the plurality of first writes in a first buffer associated with the first CPU core, and recording offsets and lengths of the second portion of the plurality of first writes in a first buffer associated with the second CPU core.

In certain arrangements, a first portion of the plurality of second writes are processed by the first CPU core, and a second portion of the plurality of second writes are processed by the second CPU core. The method includes recording offsets and lengths of the first portion of the plurality of second writes in a second buffer associated with the first CPU core, and recording offsets and lengths of the second portion of the plurality of second writes in a second buffer associated with the second CPU core.

In certain arrangements, a user snapshot of the source volume is created during the second tracking session. The method includes recording creation of the user snapshot in a buffer associated with each CPU core that processes writes directed to the source volume in the second tracking session.

In certain arrangements, a user snapshot of the source volume is deleted during the second tracking session. The method includes recording deletion of the user snapshot in a buffer associated with each CPU core that processes writes directed to the source volume in the second tracking session.

In certain arrangements, the first tracking session has a first tracking session identifier (ID), and the second tracking session has a second tracking session ID. The method includes tagging each first write with the first tracking session ID, and tagging each second write with the second tracking session ID.

In certain arrangements, the method includes recording first records of the offsets and lengths of the respective first writes in the volatile memory, and recording second records of the offsets and lengths of the respective second writes in the volatile memory.

In certain arrangements, each first record is associated with a first key-value pair, a first key of the first key-value pair is the first tracking session ID, and a first value of the first key-value pair is a first pointer to a first buffer containing the first record.

In certain arrangements, each second record is associated with a second key-value pair, a second key of the second key-value pair is the second tracking session ID, and a second value of the second key-value pair is a second pointer to a second buffer containing the second record.

In certain embodiments, a system includes a memory, and processing circuitry configured to execute program instructions out of the memory to receive, at a volatile memory of a storage system, first data specified in a plurality of first writes directed to a source volume in a first tracking session. The first tracking session corresponds to a first replication interval of an asynchronous replication process. The processing circuitry is configured to execute the program instructions out of the memory, in response to receipt of the first data specified in the plurality of first writes, to record offsets and lengths of the respective first writes in the volatile memory; in response to an end of the first tracking session, to obtain a first list of the recorded offsets and lengths of the respective first writes from the volatile memory; to identify first areas of the source volume written to in the first tracking session using the obtained first list; and to replicate the first data from the identified first areas of the source volume to a destination volume.

In certain arrangements, the processing circuitry is configured to execute the program instructions out of the memory to receive, at the volatile memory of the storage system, second data specified in a plurality of second writes directed to the source volume in a second tracking session. The second tracking session corresponds to a second replication interval of the asynchronous replication process. The processing circuitry is configured to execute the program instructions out of the memory, in response to receipt of the second data specified in the plurality of second writes, to record offsets and lengths of the respective second writes in the volatile memory.

In certain arrangements, the processing circuitry is configured to execute the program instructions out of the memory, in response to an end of the second tracking session, to obtain a second list of the recorded offsets and lengths of the respective second writes from the volatile memory, to identify second areas of the source volume written to in the second tracking session using the obtained second list, and to replicate the second data from the identified second areas of the source volume to the destination volume.

In certain arrangements, a first portion of the plurality of first writes are processed by a first central processing unit (CPU) core, and a second portion of the plurality of first writes are processed by a second CPU core. The processing circuitry is configured to execute the program instructions out of the memory to record offsets and lengths of the first portion of the plurality of first writes in a first buffer associated with the first CPU core, and to record offsets and lengths of the second portion of the plurality of first writes in a first buffer associated with the second CPU core.

In certain arrangements, a first portion of the plurality of second writes are processed by the first CPU core, and a second portion of the plurality of second writes are processed by the second CPU core. The processing circuitry is configured to execute the program instructions out of the memory to record offsets and lengths of the first portion of the plurality of second writes in a second buffer associated with the first CPU core, and to record offsets and lengths of the second portion of the plurality of second writes in a second buffer associated with the second CPU core.

In certain arrangements, a user snapshot of the source volume is created during the second tracking session. The processing circuitry is configured to execute the program instructions out of the memory to record creation of the user snapshot in a buffer associated with each CPU core that processes writes directed to the source volume in the second tracking session.

In certain embodiments, a computer program product includes a set of non-transitory, computer-readable media having instructions that, when executed by processing circuitry, cause the processing circuitry to perform a method including receiving, at a volatile memory of a storage system, first data specified in a plurality of first writes directed to a source volume in a first tracking session. The first tracking session corresponds to a first replication interval of an asynchronous replication process. The method includes, in response to receipt of the first data specified in the plurality of first writes, recording offsets and lengths of the respective first writes in the volatile memory, and, in response to an end of the first tracking session, obtaining a first list of the recorded offsets and lengths of the respective first writes from the volatile memory. The method includes identifying first areas of the source volume written to in the first tracking session using the obtained first list, and replicating the first data from the identified first areas of the source volume to a destination volume.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 3a is an exemplary illustration of how locations (e.g., offsets) and lengths of writes directed to a source volume and processed by a first central processing unit (CPU) core of the multi-core processing circuitry of FIG. 2 can be tracked and recorded in the data cache of FIG. 2;

FIG. 3b is an exemplary illustration of how offsets and lengths of writes directed to the source volume of FIG. 3a and processed by a second CPU core of the multi-core processing circuitry of FIG. 2 can be tracked and recorded in the data cache of FIG. 2;

FIG. 4 is a TABLE containing exemplary tracking session identifiers (IDs), write offsets and lengths, and CPU cores that process the writes to the source volume of FIGS. 3a-3c, as well as an exemplary indication of creation of a user snap of the source volume.

DETAILED DESCRIPTION

Techniques are disclosed herein for tracking write requests (or "writes") and snapshot (or "snap") creation/deletion in memory to improve asynchronous replication performance and support lower recovery point objectives (RPOs). In the disclosed techniques, a storage system can use its data cache to receive data specified in incoming writes issued by storage client computers (or "storage clients"), while tracking and recording locations (e.g., offsets) and lengths of writes directed to a source volume in data cache memory. At the end of a replication interval, the storage system can obtain a list of the recorded offsets and lengths of writes for the source volume, identify and read areas of the source volume that were written to, overwritten, or modified using the obtained list, and replicate data from the identified areas to a destination volume. Because the list of recorded offsets/lengths of writes for the source volume is compiled and available from volatile cache memory, it can be generated and accessed very quickly using reduced processing and memory resources, thereby allowing for lower RPOs in asynchronous replication processes.

Figure 1:
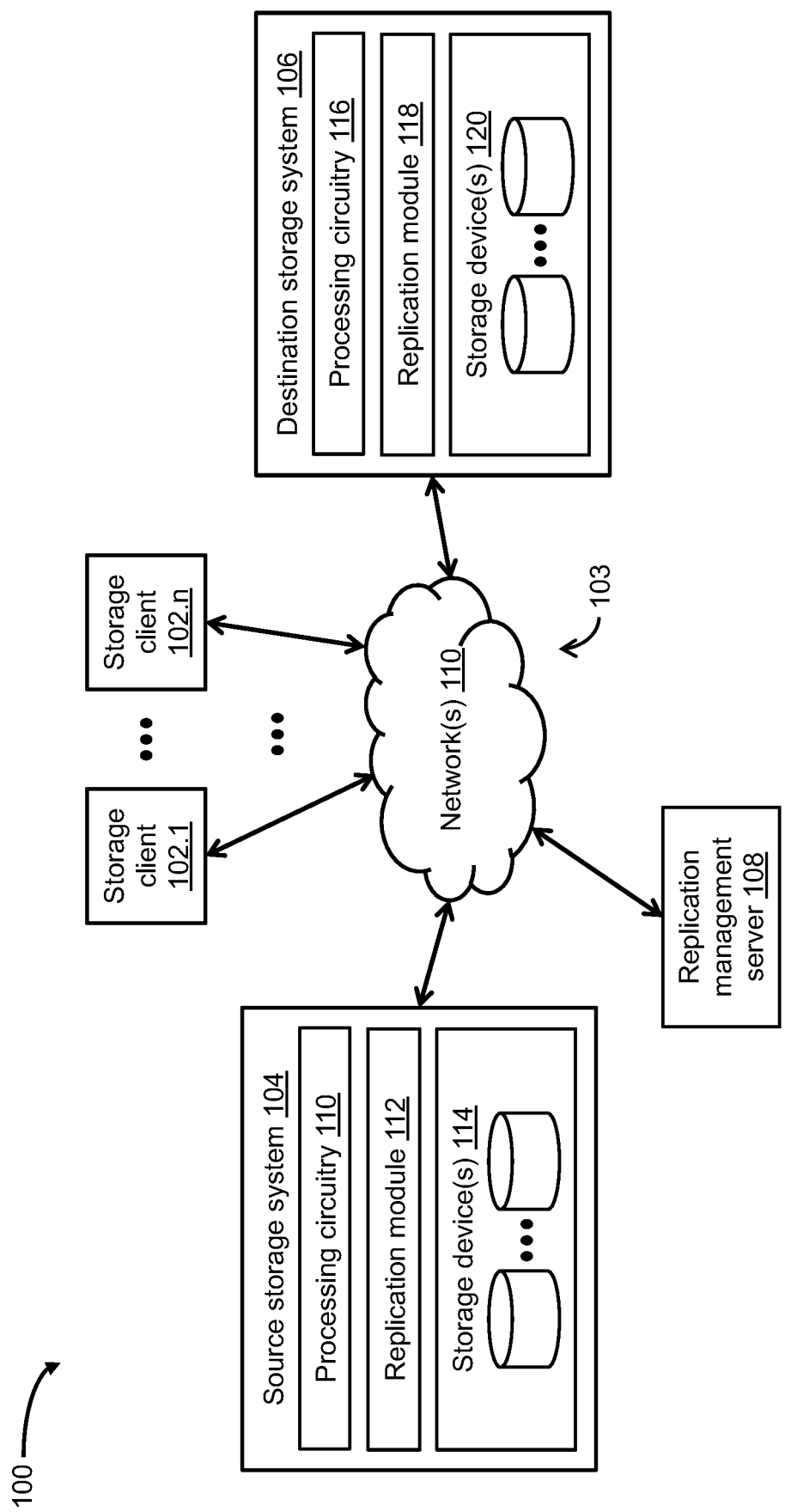
FIG. 1 is a block diagram of an exemplary storage environment, in which techniques can be practiced for tracking write requests and snap creation/deletion in memory to improve asynchronous replication performance and support lower RPOs.

FIG. 1 depicts an illustrative embodiment of an exemplary storage environment 100, in which techniques can be practiced for tracking writes and snap creation/deletion in memory to improve asynchronous replication performance and support lower RPOs. As shown in FIG. 1, the storage environment 100 can include a plurality of storage clients 102.1, . . . , 102.n, a source storage system 104, a destination storage system 106, a replication management server 108, and a communications medium 103 that includes at least one network 110. The plurality of storage clients 102.1, . . . , 102.n can be configured to provide, over the network(s) 110, storage input/output (IO) requests (e.g., small computer system interface (SCSI) commands, network file system (NFS) commands) to the source storage system 104 and/or the destination storage system 106. Such storage IO requests (e.g., write requests or "writes", read requests or "reads") can direct the source storage system 104 or the destination storage system 106 to write or read data blocks, data pages, data files, or any other suitable data elements to/from volumes (VOLs), virtual volumes (VVOLs) (e.g., VMware® VVOLs), logical units (LUs), filesystems, directories, files, or any other suitable storage objects maintained in association with the source storage system 104 or the destination storage system 106.

As shown in FIG. 1, the source storage system 104 can include processing circuitry 110, a replication module 112, and a plurality of storage devices 114 (e.g., hard disk drives (HDDs), solid-state drives (SSDs), flash devices) configured to provide access to data or metadata on source storage objects organized as VOLs, VVOLs, LUs, filesystems, directories, files, and so on. Likewise, the destination storage system 106 can include processing circuitry 116, a replication module 118, and a plurality of storage devices 120 (e.g., HDDs, SSDs, flash devices) configured to provide access to data or metadata on destination storage objects organized as VOLs, VVOLs, LUs, filesystems, directories, files, and so on.

The replication management server 108 can be configured to manage execution of jobs for replicating storage objects on the source storage system 104 to destination storage objects on the destination storage system 106. To that end, the replication management server 108 can control the timing of snap creation or deletion, as well as the timing of data transmissions or transfers from the source storage system 104 to the destination storage system 106. As employed herein, the term "snapshot" or "snap" refers to a point-in-time (PIT) replica or copy of a storage object (e.g., a VOL, VVOL, LU, filesystem, directory, file) along with its associated metadata. Such a snap can be a replica of a full copy of a storage object, or a space-efficient copy of a storage object that stores changes or differences in data (or "data differences") between a current version of the storage object and a prior version of the storage object that existed at the time when a snap was last created. The replication management server 108 can schedule execution of replication jobs at replication intervals in compliance with an RPO for a given replication workload, thereby assuring that replicas or copies (e.g., snaps) are not out-of-sync with a storage object or prior snaps by more than a predetermined amount of time.

The communications medium 103 can be configured to interconnect the plurality of storage clients 102.1, . . . , 102.n, the source storage system 104, and the destination storage system 106, and the replication management server 108 to enable them to communicate and exchange data and/or control signaling. As shown in FIG. 1, the communications medium 103 is illustrated as a "cloud" to represent different network topologies such as a storage area network (SAN) topology, a network attached storage (NAS) topology, a local area network (LAN) topology, a metropolitan area network (MAN) topology, a wide area network (WAN) topology, and so on. As such, the communications medium 103 can include copper-based data communications devices and cabling, fiber optic devices and cabling, wireless devices, and so on, or any suitable combination thereof.

Figure 2:
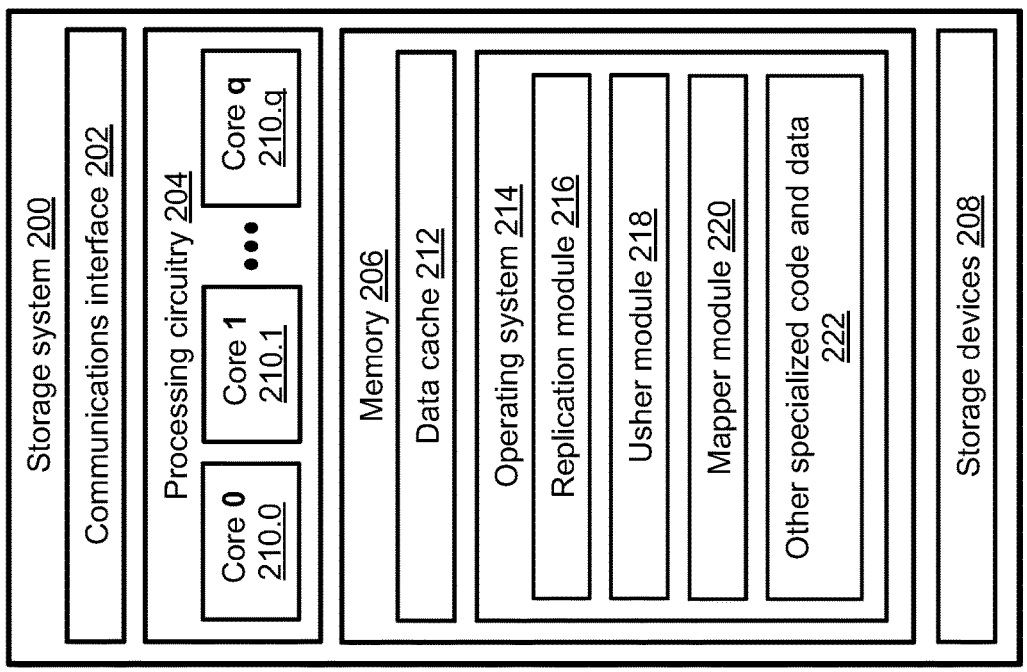
FIG. 2 is a block diagram of an exemplary storage system included in the storage environment of FIG. 1, in which the storage system includes multi-core processing circuitry and a data cache.

FIG. 2 depicts an exemplary storage system 200 that can be included in the storage environment 100 of FIG. 1. It is noted that each of the source storage system 104 and the destination storage system 106 can be configured like the storage system 200 of FIG. 2. As shown in FIG. 2, the storage system 200 can include a communications interface 202, processing circuitry 204, a memory 206, and a plurality of storage devices 208. The communications interface 202 can include one or more of an Ethernet interface, an Infini-Band interface, a fiber channel interface, and/or any other suitable interface. The communications interface 202 can further include SCSI target adapters, network interface adapters, and/or any other suitable adapters for converting electronic, optical, and/or wireless signals received over the network(s) 110 to a form suitable for use by the processing circuitry 204. The processing circuitry 204 (e.g., a central processing unit (CPU)) can include a set of cores (e.g., CPU cores), namely, a core "0" 210.0, a core "1" 210.1, and so on, up to a core "q" 210.q, in which "q" can be equal to eight (8), sixteen (16), thirty-two (32), sixty-four (64), one hundred twenty-eight (128), or any other suitable number of cores.

The memory 206 can include volatile/nonpersistent memory (e.g., random access memory (RAM), dynamic RAM (DRAM), static RAM (SRAM) such as a data cache 212, as well as nonvolatile/persistent memory (e.g., non-volatile RAM (NVRAM), flash memory, magnetic memory). The memory 206 can accommodate an operating system 214 such as a Linux operating system (OS), Unix OS, Windows OS, or any other suitable OS, as well as a plurality of specialized software modules including a replication module 216, an usher module 218, a mapper module 220, and other specialized code and data 222. The processing circuitry 204 can execute the specialized software modules 216, 218, 220 and other specialized code and data 222 out of the memory 206, process storage IO requests (e.g., writes, reads) issued by the storage clients 102.1, ..., 102.n, and store data or metadata to the storage devices 208 (e.g., in a storage array) within the storage environment 100, which can be a clustered RAID environment.

The replication module 216 can be configured to perform asynchronous replication processes, which can involve performing write operations to write data or metadata to source storage objects (e.g., source VOLs) maintained in association with the source storage system 104, and acknowledging completion of the write operations to the storage clients 102.1, ..., and/or 102.n before the data or metadata is replicated to destination storage objects (e.g., destination VOLs). In the disclosed techniques, locations (e.g., offsets) and lengths of writes to a source VOL can be tracked and recorded in the data cache 212, and a list of the recorded offsets and lengths can be obtained and used in an asynchronous replication process. The writes can be tracked in successive tracking sessions, each of which can have a system-wide, unique tracking session ID. The usher module 218 can be configured to tag each write with the appropriate tracking session ID, and implement write and read queues. The mapper module 220 can be configured to implement a mapping layer, and functionality for creating snaps and determining snapshot differentials (or "snap diffs"). The operation of the specialized software modules 216, 218, 220 and other specialized code and data 222 will be further described herein with reference to an illustrative example.

In the context of the processing circuitry 204 being implemented using the set of cores "0" to "q" 210.0, ..., 210.q and executing the specialized software modules 216, 218, 220 and other code and data 222 (e.g., program instructions), a computer program product can be configured to deliver all or a portion of the specialized software modules, code, and data to the processing circuitry 204. Such a computer program product can include one or more non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the processing circuitry 204, the various techniques and/or methods disclosed herein.

During operation, the source storage system 104 can use its data cache 212 to receive data specified in write requests issued by the storage clients 102.1, ..., and/or 102.n, while dedicating an amount of data cache memory to track and record locations (e.g., offsets) and lengths of writes to a source VOL maintained in association with the source storage system 104. At the end of a replication interval, the source storage system 104 can obtain a list of the recorded offsets and lengths of incoming writes for the source VOL, identify and read areas of the source VOL that were written to, overwritten, or modified using the obtained list, and replicate data from the identified areas to a destination VOL maintained in association with the destination storage system 106. Because the list of recorded offsets/lengths of writes for the source volume is compiled and available from volatile memory of the data cache 212, it can be generated and accessed very quickly using reduced processing and memory resources, thereby allowing for lower RPOs (e.g., less than five (5) minutes, less than one (1) minute) in asynchronous replication processes.

Figure 3C:
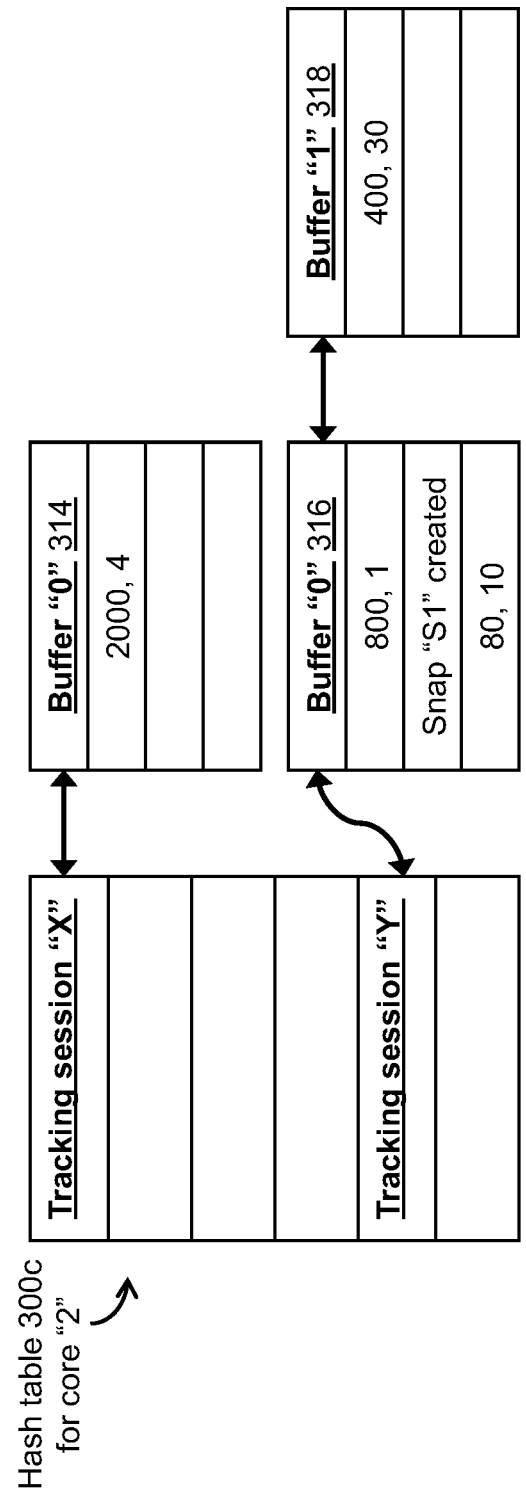
FIG. 3c is an exemplary illustration of how offsets and lengths of writes directed to the source volume of FIG. 3a and processed by a third CPU core of the multi-core processing circuitry of FIG. 2 can be tracked and recorded in the data cache of FIG. 2.

The disclosed techniques will be further understood with reference to the following illustrative example and FIGS. 3a-3c and 4. As described herein, locations (e.g., offsets) and lengths of incoming writes to a source VOL can be tracked and recorded in the data cache 212 of the storage system 200 (see FIG. 2), which can correspond to the source storage system 104 (see FIG. 1). In this example, a series of writes to the source VOL are recorded in the data cache 212 on buffers for three (3) CPU cores of the processing circuitry 204, namely, a core "0", a core "1", and a core "2". Further, the writes are tracked in two (2) successive tracking sessions that have tracking session IDs "X" and "Y", respectively, in which each tracking session X, Y corresponds to a specific replication interval for the source VOL. As such, the tracking session "X" can be regarded as a static (or "frozen") tracking session, while the tracking session "Y" can be regarded as an active tracking session. For example, the offsets and lengths of incoming writes may be recorded in the data cache 212 in data structures (or "records") that have a size of eight (8) bytes, or any other suitable size. In addition, the granularity of the tracking may be set to 4 kilobytes (Kb), or any other suitable granularity, to reduce the number of bits needed to represent the offsets and the lengths. It is noted that, in this example, an asynchronous replication process involves creating internal snaps of the source VOL at the beginning and at the end of each tracking session, while allowing the creation of user snaps that are application consistent. As employed herein, the term "user snaps" refers to application consistent snapshots that capture the state of application data at the time of a backup, with all application transactions completed and all pending writes flushed to persistent storage. It is further noted that, although each buffer for the cores 0-2 is illustrated in FIGS. 3a-3c as accommodating just three (3) records, each buffer can accommodate up to several hundred records in a practical implementation.

FIG. 3a depicts, in this example, how offsets and lengths of incoming writes processed by the core "0" are tracked and recorded in the data cache 212. As shown in FIG. 3a, the data cache 212 maintains a hash table 300a for the core "0", in which each record of write offsets and lengths corresponds to a key-value pair. In this example, the key is the ID (e.g., X, Y) (e.g., hash ID information) of a tracking session, and the value is a pointer to a buffer (e.g., a buffer "0" 306) or buffer chain (e.g., a buffer "0" 302, a buffer "1" 304). Likewise, FIGS. 3b and 3c depict, in this example, how offsets and lengths of incoming writes processed by the cores "1" and "2", respectively, are tracked and recorded in the data cache 212. As shown in FIG. 3b, a hash table 300b is maintained for the core "1", in which each record of write offsets and lengths is a key-value pair. The key is the ID (e.g., X, Y) (e.g., hash ID information) of the tracking session, and the value is a pointer to a buffer (e.g., a buffer "0" 308) or buffer chain (e.g., a buffer "0" 310, a buffer "1" 312). As shown in FIG. 3c, a hash table 300c is maintained for the core "2", in which each record of write offsets and lengths is a key-value pair. The key is the ID (e.g., X, Y) (e.g., hash ID information) of the tracking session, and the value is a pointer to a buffer (e.g., a buffer "0" 314) or buffer chain (e.g., a buffer "0" 316, a buffer "1" 318). It is noted that, by configuring each buffer or buffer chain to track and record writes for a specific tracking session ID on a specific CPU core, locking contentions on writes to the source VOL can be avoided.

FIG. 4 depicts a TABLE that contains the tracking session IDs X, Y, the offsets and lengths of the series of writes to the source VOL, and the CPU cores 0, 1, 2 that processed the respective writes. As shown in FIG. 4, for tracking session "X", a write having an offset of "100" and a length of "1" (×4 Kb) is processed by the core "0" and recorded in the first record (100, 1) of buffer "0" 302 (see FIG. 3a), and a write having an offset of "2000" and a length of "4" (×4 Kb) is processed by the core "2" and recorded in the first record (2000, 4) of buffer "0" 314 (see FIG. 3c). Further, for tracking session "Y", a write having an offset of "10" and a length of "10" (×4 Kb) is processed by the core "1" and recorded in the first record (10, 10) of buffer "0" 310 (see FIG. 3b), and a write having an offset of "800" and a length of "1" (×4 Kb) is processed by the core "2" and recorded in the first record (800, 1) of buffer "0" 316 (see FIG. 3c). In addition, for tracking session "X", a write having an offset of "9000" and a length of "2" (×4 Kb) is processed by the core "0" and recorded in the second record (9000, 2) of buffer "0" 302 (see FIG. 3a), and, for tracking session "Y", a write having an offset of "28" and a length of "8" (×4 Kb) is processed by the core "1" and recorded in the second record (28, 8) of buffer "0" 310 (see FIG. 3b).

In this example, a user snap "S1" of the source VOL is created during tracking session "Y". For example, information from such a user snap of a source volume may be used to create a snap of a destination volume that corresponds to an equivalent point in time. Because the incoming writes to the source VOL are recorded on buffers for the different cores 0-2, the time order of when the writes were processed can only be guaranteed for those writes processed by the individual cores "0", "1", and "2". To assure that the creation of the user snap "S1" is recorded at the correct time relative to when the incoming writes were processed, it is recorded, for all the cores 0-2, on appropriate buffers for tracking session "Y". As shown in FIG. 3a, the creation of the user snap "S1" is recorded in the first record ("Snap S1 created") of buffer "0" 306. As shown in FIG. 3b, the creation of the user snap "S1" is recorded in the third record ("Snap S1 created") of buffer "0" 310. As shown in FIG. 3c, the creation of the user snap "S1" is recorded in the second record ("Snap S1 created") of buffer "0" 316. It is noted that, because the creation of a user snap of a volume locks out all incoming writes to the volume, the creation and recording of the user snap "S1" can be performed without introducing locking contention. It is further noted that the records of snap creation for the user snap "S1" across all the cores 0-2 can be used as synchronization (or "sync") points for ordering the processing of incoming writes after the snap creation. As such, in this example, all offsets and lengths of incoming writes recorded after each snap creation record ("Snap S1 created") in buffer "0" 306, buffer "0" 310, and buffer "0" 316 are processed after the creation of a user snap of a destination volume on the destination storage system 106.

As further shown in FIG. 4, for tracking session "Y", a write having an offset of "80" and a length of "10" (×4 Kb) is processed by the core "2" and recorded in the third record (80, 10) of buffer "0" 316 (see FIG. 3c). For tracking session "X", a write having an offset of "1500" and a length of "1" (×4 Kb) is processed by the core "0" and recorded in the third record (1500, 1) of buffer "0" 302 (see FIG. 3a), a write having an offset of "500" and a length of "10" (×4 Kb) is processed by the core "1" and recorded in the first record (500, 10) of buffer "0" 308 (see FIG. 3b), and a write having an offset of "10" and a length of "3" (×4 Kb) is processed by the core "0" and recorded in the first record (10, 3) of buffer "1" 304 (see FIG. 3a). In addition, for tracking session "Y", a write having an offset of "510" and a length of "20" (×4 Kb) is processed by the core "1" and recorded in the first record (510, 20) of buffer "1" 312 (see FIG. 3b), a write having an offset of "1200" and a length of "12" (×4 Kb) is processed by the core "1" and recorded in the second record (1200, 12) of buffer "1" 312 (see FIG. 3b), and a write having an offset of "400" and a length of "30" (×4 Kb) is processed by the core "2" and recorded in the first record (400, 30) of buffer "1" 318 (see FIG. 3c).

In this example, upon completion of each successive tracking session X, Y, the source storage system 104 obtains a list of the recorded offsets and lengths of incoming writes for the tracking session X, Y, and, using the obtained list, identifies and reads areas of the source VOL that were written to, overwritten, or modified during the tracking session X, Y. The source storage system 104 then replicates data from the identified areas of the source VOL to the destination VOL. By recording offsets and lengths of the incoming writes for the source VOL in volatile memory of the data cache 212, the list of the recorded offsets/lengths can be generated and accessed very quickly using reduced processing and memory resources, thereby allowing for a lower RPO (e.g., less than five (5) minutes, less than one (1) minute) in the asynchronous replication process.

Figure 5:
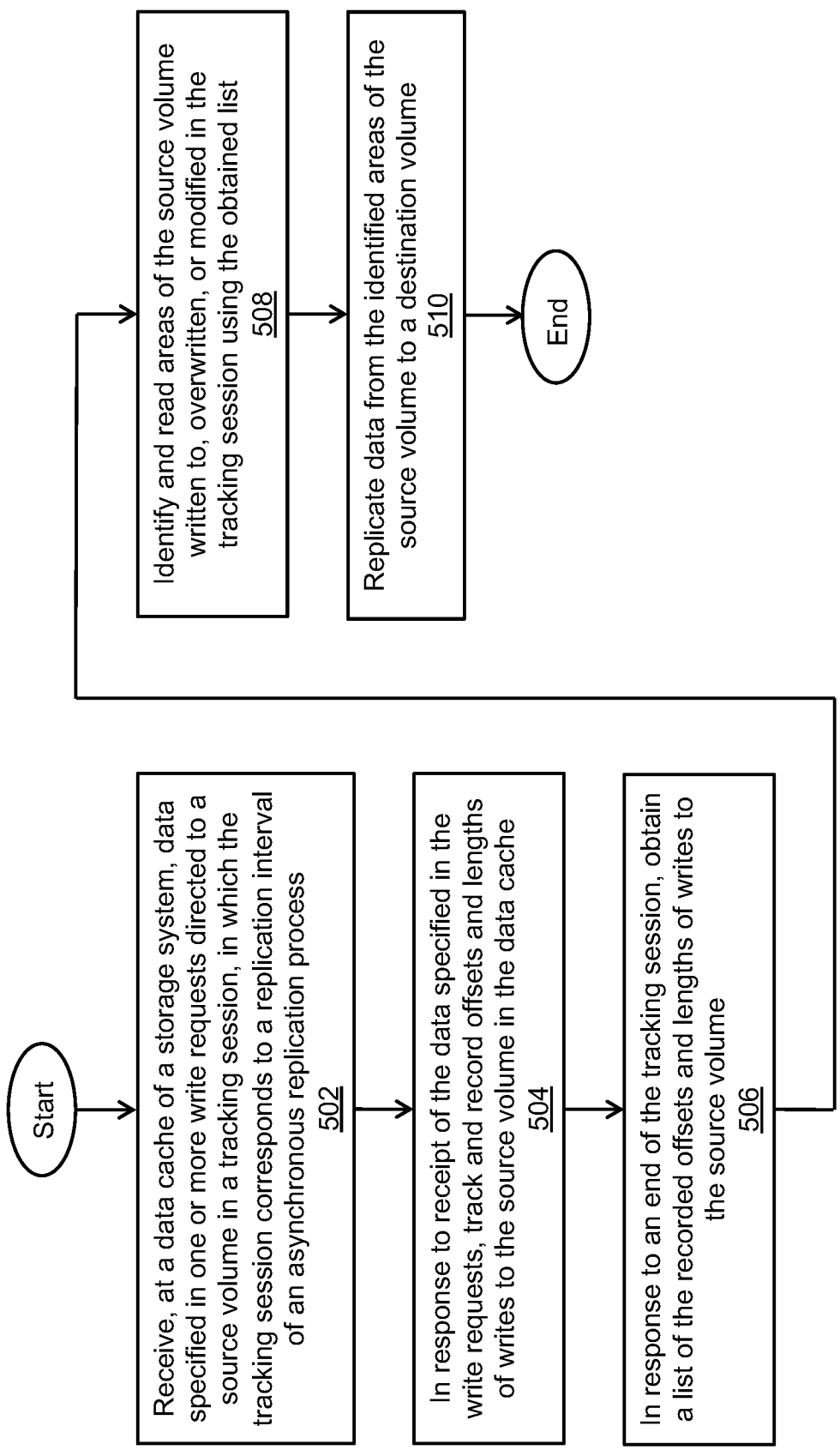
FIG. 5 is a flow diagram of an exemplary method of tracking write requests and snap creation/deletion in memory to improve asynchronous replication performance and support lower RPOs.

An exemplary method of tracking write requests and snap creation/deletion in memory to improve asynchronous replication performance and support lower RPOs is described below with reference to FIG. 5. As depicted in block 502, data specified in one or more write requests directed to a source volume in a tracking session are received at a data cache of a storage system, in which the tracking session corresponds to a replication interval of an asynchronous replication process. As depicted in block 504, in response to receipt of the data specified in the write requests, offsets and lengths of writes to the source volume are tracked and recorded in the data cache. As depicted in block 506, in response to an end of the tracking session, a list of the recorded offsets and lengths of writes to the source volume is obtained. As depicted in block 508, areas of the source volume written to, overwritten, or modified in the tracking session are identified and read using the obtained list. As depicted in block 510, data from the identified areas of the source volume are replicated to a destination volume.

Having described the above illustrative embodiments, various alternative embodiments and/or variations may be made and/or practiced. For example, it was described herein that a user snap of a source volume can be created during a tracking session. In one embodiment, a user snap of a source volume can be deleted during a tracking session, and the deletion of the user snap can be recorded, for all CPU cores, on appropriate buffers for tracking session.

It was further described herein that offsets and lengths of incoming writes to a source volume can be tracked and recorded in the data cache 212 of the storage system 200 (see FIG. 2). In one embodiment, the storage system 200 can be implemented as one of two (2) peer nodes of a clustered storage system (or "storage cluster"). In this embodiment, because information pertaining to writes to the source volume, as well as user snap creation or deletion events, are recorded and tracked in volatile memory, the write information and/or user snap creation/deletion events recorded on one peer node can be propagated to the other peer node using existing communication mechanisms between the respective nodes. Further, if one peer node is required to re-boot, then it can receive all pending tracking information for the writes and/or user snap creation/deletion events from the other peer node as part of a data cache initialization process.

It was further described herein that the mapper module 220 (see FIG. 2) can be configured to implement a mapping layer, as well as functionality for creating snaps and determining snapshot differentials (or "snap diffs"). In one embodiment, the tracking and recording of offsets and lengths of incoming writes to a source volume in the data cache 212 can be used as a "best-effort" approach based on the availability of cache memory. In one embodiment, if the data cache 212 lacks sufficient memory for recording offsets/lengths of incoming writes to the source volume, then the storage system 200 can revert to using the mapper module 220 to determine the snap diffs. If the data cache 212 returns to a state where it has sufficient memory for recording offsets/lengths of incoming writes to the source volume, then the storage system 200 can resume tracking and recording of offsets and lengths of the incoming writes in the data cache 212.

It was further described herein that because a list of recorded offsets/lengths of writes for a source volume can be compiled and made available from volatile memory of the data cache 212 (see FIG. 2), it can be generated and accessed very quickly using reduced processing and memory resources. In one embodiment, the data cache 212 can be configured to include a plurality of 4 Kb buffers, each of which can store five hundred (500) 8-byte records. As such, for a storage cluster with 200,000 (or "200K") write IOs per second (IOPS) on each storage node, the number of buffers per second (sec) needed to service the writes can be equal to 200K/500 or 400 buffers/see, which corresponds to 1.6 megabytes (Mb)/sec. Further, at any given time, there can be two (2) tracking sessions per volume under replication, namely, (i) a frozen tracking session previously used for tracking writes, which are currently being used to perform a first replication sync, and (ii) an active tracking session currently being used for tracking writes, which will subsequently be used to perform a next replication sync. If the replication interval for each tracking sessions is fifteen (15) seconds, then the amount of memory needed to track writes for both tracking sessions on a single node can be equal to about 48 Mb. However, because each storage node can track writes for both nodes of the storage cluster, the amount of memory needed to track the writes can doubled to about 96 Mb. In this embodiment, because each buffer is configured to track and record offsets/lengths of writes processed on a specific CPU core for a specific tracking session, the amount of memory needed to track the writes can be expected to be on the order of about 200 Mb. It is noted that reducing the RPOs can reduce the write tracking memory requirements.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
receiving, at a storage system, first data specified in a plurality of first writes directed to a source volume in a first tracking session, the first tracking session having a first tracking session ID and corresponding to a first replication interval of an asynchronous replication process;
processing, by a first core of a central processing unit (CPU), a first portion of the plurality of first writes from the first tracking session, the first core being associated with a first hash table containing at least a first key-value pair entry, a key of the first key-value pair entry corresponding to the first tracking session ID, a value of the first key-value pair entry corresponding to a pointer to a first buffer for the first tracking session;
processing, by a second core of the CPU, a second portion of the plurality of first writes from the first tracking session, the second core being associated with a second hash table containing at least a second key-value pair entry, a key of the second key-value pair entry corresponding to the first tracking session ID, a value of the second key-value pair entry corresponding to a pointer to a second buffer for the first tracking session;
recording, in the first buffer for the first tracking session, offsets and lengths of the first portion of the plurality of first writes processed by the first core;
recording, in the second buffer for the first tracking session, offsets and lengths of the second portion of the plurality of first writes processed by the second core;
in response to an end of the first tracking session, obtaining a first list of the recorded offsets and lengths of the first portion of the plurality of first writes and the second portion of the plurality of first writes;
identifying first areas of the source volume written to in the first tracking session using the obtained first list; and
replicating the first data from the identified first areas of the source volume to a destination volume.

2. The method of claim 1 further comprising:
receiving, at the storage system, second data specified in a plurality of second writes directed to the source volume in a second tracking session, the second tracking session having a second tracking session ID and corresponding to a second replication interval of the asynchronous replication process, the first tracking session and the second tracking session corresponding to two successive tracking sessions;
processing, by the first core of the CPU, a first portion of the plurality of second writes from the second tracking session, the first hash table containing a third key-value pair entry, a key of the third key-value pair entry corresponding to the second tracking session ID, a value of the third key-value pair entry corresponding to a pointer to a first buffer for the second tracking session;
processing, by the second core of the CPU, a second portion of the plurality of second writes in the second tracking session, the second hash table containing a fourth key-value pair entry, a key of the fourth key-value pair entry corresponding to the second tracking session ID, a value of the fourth key-value pair entry corresponding to a pointer to a second buffer for the second tracking session;
recording, in the first buffer for the second tracking session, offsets and lengths of the first portion of the plurality of second writes processed by the first core; and
recording, in the second buffer for the second tracking session, offsets and lengths of the second portion of the plurality of second writes processed by the second core.

3. The method of claim 2 further comprising:
in response to an end of the second tracking session, obtaining a second list of the recorded offsets and lengths of the first portion of the plurality of second writes and the second portion of the plurality of second writes;
identifying second areas of the source volume written to in the second tracking session using the obtained second list; and
replicating the second data from the identified second areas of the source volume to the destination volume.

4. The method of claim 2 wherein a first user snapshot of the source volume is created during the second tracking session, and wherein the method further comprises:
recording creation of the first user snapshot in the first buffer for the second tracking session associated with the first core that processed the first portion of the plurality of second writes directed in the second tracking session; and
recording the creation of the first user snapshot in the second buffer for the second tracking session associated with the second core that processed the second portion of the plurality of second writes in the second tracking session.

5. The method of claim 4 further comprising:
determining that the storage system lacks sufficient volatile memory space for recording offsets and lengths of a plurality of third writes directed to the source volume in a third tracking session; and
having determined that the storage system lacks sufficient volatile memory space for recording the offsets and lengths of the plurality of third writes directed to the source volume in the third tracking session:
creating a second user snapshot of the source volume during the third tracking session; and
reverting to issuing, by the storage system, a snapshot differential bitmap request to obtain data differences between the first user snapshot of the source volume and the second user snapshot of the source volume.

6. The method of claim 5 further comprising:
determining that the storage system has returned to a state with sufficient volatile memory space for recording offsets and lengths of a plurality of fourth writes directed to the source volume in a fourth tracking session; and
having determined that the storage system has returned to the state with sufficient volatile memory space for recording the offsets and lengths of the plurality of fourth writes directed to the source volume in the fourth tracking session:
returning to recording, by the storage system, the offsets and lengths of the plurality of fourth writes in at least one buffer for the fourth tracking session.

7. The method of claim 2 wherein a user snapshot of the source volume is deleted during the second tracking session, and wherein the method further comprises:
recording deletion of the user snapshot in the first buffer for the second tracking session associated with the first core that processed the first portion of the plurality of second writes in the second tracking session; and
recording the deletion of the user snapshot in the second buffer for the second tracking session associated with the second core that processed the second portion of the plurality of second writes in the second tracking session.

8. The method of claim 2 further comprising:
tagging each first write with the first tracking session ID; and
tagging each second write with the second tracking session ID.

9. A system comprising:
a memory; and
processing circuitry configured to execute program instructions out of the memory to:
receive, at a storage system, first data specified in a plurality of first writes directed to a source volume in a first tracking session, the first tracking session having a first tracking session ID and corresponding to a first replication interval of an asynchronous replication process;
process, by a first core of a central processing unit (CPU), a first portion of the plurality of first writes from the first tracking session, the first core being associated with a first hash table containing at least a first key-value pair entry, a key of the first key-value pair entry corresponding to the first tracking session ID, a value of the first key-value pair entry corresponding to a pointer to a first buffer for the first tracking session;
process, by a second core of the CPU, a second portion of the plurality of first writes from the first tracking session, the second core being associated with a second hash table containing at least a second key-value pair entry, a key of the second key-value pair entry corresponding to the first tracking session ID, a value of the second key-value pair entry corresponding to a pointer to a second buffer for the first tracking session;
record, in the first buffer for the first tracking session, offsets and lengths of the first portion of the plurality of first writes processed by the first core;
record, in the second buffer for the first tracking session, offsets and lengths of the second portion of the plurality of first writes processed by the second core;
in response to an end of the first tracking session, obtain a first list of the recorded offsets and lengths of the first portion of the plurality of first writes and the second portion of the plurality of first writes;
identify first areas of the source volume written to in the first tracking session using the obtained first list; and
replicate the first data from the identified first areas of the source volume to a destination volume.

10. The system of claim 9 wherein the processing circuitry is further configured to execute the program instructions out of the memory to:
receive, at the storage system, second data specified in a plurality of second writes directed to the source volume in a second tracking session, the second tracking session having a second tracking session ID and corresponding to a second replication interval of the asynchronous replication process, the first tracking session and the second tracking session corresponding to two successive tracking sessions;
process, by the first core of the CPU, a first portion of the plurality of second writes from the second tracking session, the first hash table containing a third key-value pair entry, a key of the third key-value pair entry corresponding to the second tracking session ID, a value of the third key-value pair entry corresponding to a pointer to a first buffer for the second tracking session;
process, by the second core of the CPU, a second portion of the plurality of second writes in the second tracking session, the second hash table containing a fourth key-value pair entry, a key of the fourth key-value pair entry corresponding to the second tracking session ID, a value of the fourth key-value pair entry corresponding to a pointer to a second buffer for the second tracking session;
record, in the first buffer for the second tracking session, offsets and lengths of the first portion of the plurality of second writes processed by the first core; and
record, in the second buffer for the second tracking session, offsets and lengths of the second portion of the plurality of second writes processed by the second core.

11. The system of claim 10 wherein the processing circuitry is further configured to execute the program instructions out of the memory to:
in response to an end of the second tracking session, obtain a second list of the recorded offsets and lengths of the first portion of the plurality of second writes and the second portion of the plurality of second writes;
identify second areas of the source volume written to in the second tracking session using the obtained second list; and
replicate the second data from the identified second areas of the source volume to the destination volume.

12. The system of claim 10 wherein a user snapshot of the source volume is created during the second tracking session, and wherein the processing circuitry is further configured to execute the program instructions out of the memory to:
record creation of the user snapshot in the first buffer for the second tracking session associated with the first core that processed the first portion of the plurality of second writes in the second tracking session; and
record the creation of the user snapshot in the second buffer for the second tracking session associated with the second core that processed the second portion of the plurality of second writes in the second tracking session.

13. A computer program product including a set of non-transitory, computer-readable media having instructions that, when executed by processing circuitry, cause the processing circuitry to perform a method comprising:
receiving, at a storage system, first data specified in a plurality of first writes directed to a source volume in a first tracking session, the first tracking session having a first tracking session ID and corresponding to a first replication interval of an asynchronous replication process;

processing, by a first core of a central processing unit (CPU), a first portion of the plurality of first writes from the first tracking session, the first core being associated with a first hash table containing at least a first key-value pair entry, a key of the first key-value pair entry corresponding to the first tracking session ID, a value of the first key-value pair entry corresponding to a pointer to a first buffer for the first tracking session;

processing, by a second core of the CPU, a second portion of the plurality of first writes from the first tracking session, the second core being associated with a second hash table containing at least a second key-value pair entry, a key of the second key-value pair entry corresponding to the first tracking session ID, a value of the second key-value pair entry corresponding to a pointer to a second buffer for the first tracking session;

recording, in the first buffer for the first tracking session, offsets and lengths of the first portion of the plurality of first writes processed by the first core;

recording, in the second buffer for the first tracking session, offsets and lengths of the second portion of the plurality of first writes processed by the second core;

in response to an end of the first tracking session, obtaining a first list of the recorded offsets and lengths of the first portion of the plurality of first writes and the second portion of the plurality of first writes;

identifying first areas of the source volume written to in the first tracking session using the obtained first list; and replicating the first data from the identified first areas of the source volume to a destination volume.

14. The computer program product of claim 13 wherein the method further comprises:

receiving, at the storage system, second data specified in a plurality of second writes directed to the source volume in a second tracking session, the second tracking session having a second tracking session ID and corresponding to a second replication interval of the asynchronous replication process, the first tracking session and the second tracking session corresponding to two successive tracking sessions;

processing, by the first core of the CPU, a first portion of the plurality of second writes from the second tracking session, the first hash table containing a third key-value pair entry, a key of the third key-value pair entry corresponding to the second tracking session ID, a value of the third key-value pair entry corresponding to a pointer to a first buffer for the second tracking session;

processing, by the second core of the CPU, a second portion of the plurality of second writes in the second tracking session, the second hash table containing a fourth key-value pair entry, a key of the fourth key-value pair entry corresponding to the second tracking session ID, a value of the fourth key-value pair entry corresponding to a pointer to a second buffer for the second tracking session;

recording, in the first buffer for the second tracking session, offsets and lengths of the first portion of the plurality of second writes processed by the first core; and recording, in the second buffer for the second tracking session, offsets and lengths of the second portion of the plurality of second writes processed by the second core.

15. The computer program product of claim 14 wherein the method further comprises:

in response to an end of the second tracking session, obtaining a second list of the recorded offsets and lengths of the first portion of the plurality of second writes and the second portion of the plurality of second writes;

identifying second areas of the source volume written to in the second tracking session using the obtained second list; and replicating the second data from the identified second areas of the source volume to the destination volume.

\* \* \* \* \*